United States Patent Office 3,451,641
Patented June 24, 1969

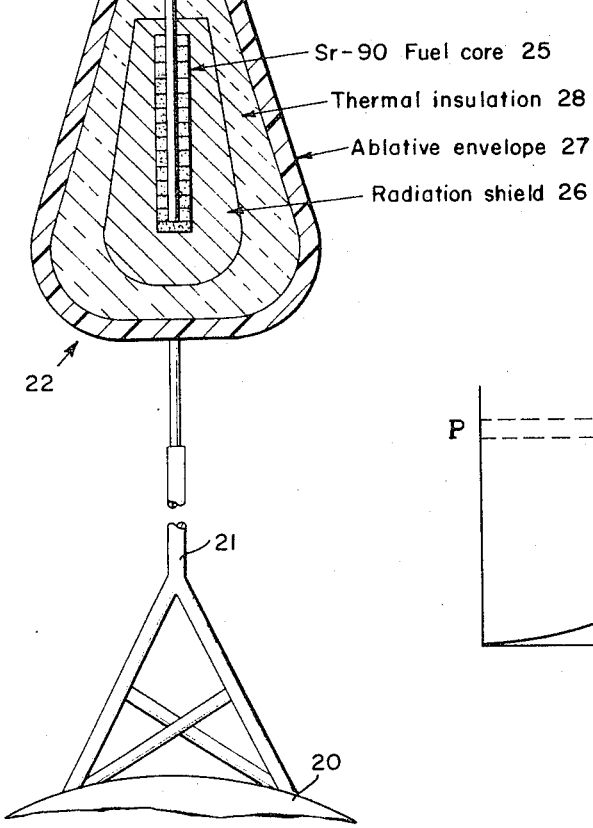
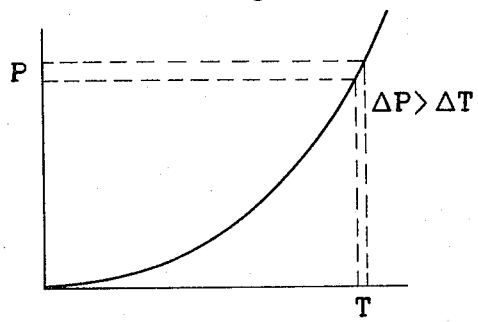
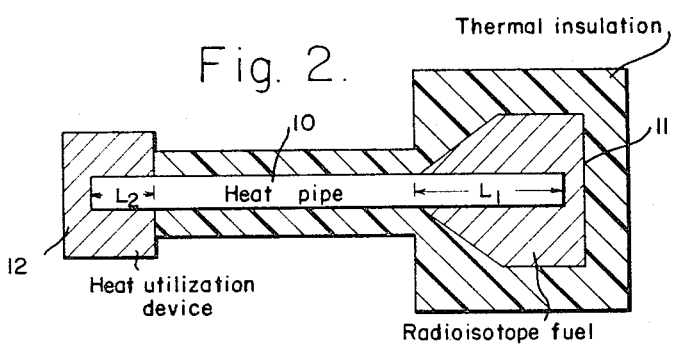
Elias L. Leventhal,
INVENTOR.

3,451,641
THERMOELECTRIC CONVERSION SYSTEM
Elias L. Leventhal, Pacific Palisades, Calif., assignor to TRW Inc., Redondo Beach, Calif., a corporation of Ohio
Continuation-in-part of application Ser. No. 422,863, Dec. 31, 1964. This application Feb. 14, 1967, Ser. No. 616,035
Int. Cl. 64g *1/00;* G21h *1/10;* G21d *7/00*
U.S. Cl. 244—1                                6 Claims

ABSTRACT OF THE DISCLOSURE

A combination for extracting heat from a nuclear fuel source by means of a heat pipe interconnecting the nuclear heat source with thermal electric converters to more efficiently convert the extracted heat into electrical energy.

---

This application is a continuation in part of copending application Ser. No. 422,863 filed Dec. 31, 1964, now abandoned.

This invention relates to a thermoelectric conversion system and more particularly to an improved system for converting radioisotope energy to electric energy.

Many radioisotopes, if used directly as sources of heat, produce undesirable radiation such as gammas, bremmstrahlung and neutrons which require the use of a shielding material. The added shielding either interposes a heat resistance between the isotope and the heat consuming device or else results in a nuclear shield going around the whole device adding an excessive weight to the device. If a radioisotope thermoelectric generator is used and shielding is placed around the radioisotope, an excessive temperature drop between the radioisotope and the hot junction of the thermoelements will result and consequently a low conversion efficiency is achieved. If the shielding is placed around the whole generator, it will be excessively heavy and also result in a thermal resistance at the cold junction side of the thermoelectric generator, resulting in an increase in the cold junction temperature with a consequent decrease in conversion efficiency.

In the invention a "heat pipe" is used for isolating the radioisotope and necessary shielding separately from a heat-consuming device like a thermoelectric converter, thereby transferring the heat generated by the decaying isotope with a minimum of heat loss.

An important feature of the invention is that it is now possible to use Strontium 90 as a heat source in power generators on spacecrafts without fear of contaminating occupants, components or experiments that are sensitive to nuclear radiation. Strontium 90 has been picked as an illustration because it is a radioisotope that is abundant, has a long half life (27 years) and is relatively inexpensive.

The "heat pipe" which is an essential part of this invention is capable of transferring heat isothermally and with a minimum of heat loss. The radioisotope heat source is located compactly at one end of the heat pipe and surrounded with nuclear shielding. In this particular case, thermal resistances are desired around the heat source to minimize losses which are obtained by means of the nuclear shielding materials. The isotope heat source can be made compact and surrounded completely with shielding material. The isotope can also be surrounded by a heat resistant enclosure that improves the shielding and the thermal insulation and also contains the radioisotope to protect it from burning up or dispersing during re-entry.

Further objects and advantages of this invention will be made more apparent by referring now to the accompanying drawing wherein:

FIGURE 1 is a curve illustrating the operation of the heat pipe;

FIGURE 2 is a block diagram illustrating the application of a heat pipe to the present invention; and FIGURE 3 illustrates a spacecraft embodiment of the invention for converting heat from a radioisotope source to electricity by means of a heat pipe.

The heat pipe or Grover pipe as it is sometimes called is a discovery generally attributed to Dr. Grover during his stay in Los Alamos. At the present time, the only published description of the heat pipe appears in Journal of Applied Physics, vol. 35, No. 6, pp. 1990–1991 in an article entitled "Structures of Very High Thermal Conductance" by G. M. Grover, T. P. Cotter and G. F. Erickson. The heat pipe is a device that transfers heat by the movement of a fluid that changes physical state. The heat is transferred isothermally since the vapor is in contact with the condensed liquid and only an exchange of latent heat occurs. One embodiment of the heat pipe consists of a metallic pipe with the inside walls lined with several layers of a metallic screen that acts as a capillary wick. A working fluid is sealed within the pipe at a relatively high vacuum (about $10^{-6}$ atm.) at room temperature. The materials (pipe, screen and working fluid) are selected according to the design operating temperature. Los Alamos has worked with tantalum pipe and screen and silver as a working fluid at 2000° C. with niobium, 1% zirconium pipe and screen and lithium at 1300 to 1400° C., with stainless steel pipe and screen and sodium at 850° C. and stainless steel pipe and screen and an organic fluid at 150 to 200° C. Cesium at 350° C. has also been tried.

The heat pipe operation is on the very steep side of the temperature-pressure curve for the working fluid, so that small drops in pressure result in negligible temperature differences. A sample curve is shown below in FIGURE 1.

To avoid extreme stresses on the pipe at the operating temperature, the internal pressure has been maintained below one atmosphere (between 50 and 500 mm. of Hg). The only limits on the operation of a heat pipe are due to pressure drops through the pipe and through the capillary wick. The higher the available pressure drop, the more heat transfer capability the pipe has. The pressure drop available is a function of the surface tension of the working fluid on the pipe material and the cosine of the angle at which the liquid droplet wets the screen.

$$P_a = 2\sigma \cos \theta$$

The pressure drop decreases as the pore size decreases. The wire screen used is 100 mesh with 10,000 pores/sq.

in. The pressure drop on the liquid can be found with the expression $$P_1 = \frac{4\eta Lbm_1}{\pi^2(r_w^2 - r_v^2)\nu r_p^4 \rho_1}$$

where $\eta$ = viscosity of liquid
$L$ = length of tube
$b$ = is a factor determined by LASL and that varies between 1 and 2
$m_1$ = mass flow of liquid
$r_w$ = outside radius of wick (i.d. of pipe)
$r_v$ = inside radius of wick
$\nu$ = surface tension of liquid
$r_p$ = radius of the pore (equivalent)
$\rho$ = liquid density.

The latent heats of the fluids used have been computed as:

| | Cal./g. |
|---|---|
| Li | 4680 |
| Na | 1005 |
| Ag | 556 |
| Cs | 146 |
| Organic | 76 |

At the present time, a Ta-Ag heat pipe has been operating for 176 hours accumulated total with many freeze-melt cycles. A NB 1% Zr-Li pipe has been operating for a few hundred hours. One of the latter pipes enclosed in a quartz pipe maintains a vacuum around it of about $10^{-6}$ to $10^{-7}$ mm. Hg. was heated with a water cooled copper induction coil placed around one of the ends of the pipe. The full pipe reached an even temperature of about 1300° C. in less than five minutes. During the heating the flow of liquid in the hot metallic pipe is visible due to the change in color. One of these defined heat pipes has been operated with a heat input of 3.5 kw. thermal. The free cross-sectional area of the pipe is of the order of 0.5 sq. cm. and has been computed to have a capability of transferring more than 7 kw. per sq. cm. cross-section.

Referring now to FIGURE 2, there is shown a block diagram of the heat pipe 10 used to extract heat isothermally from a radioisotope heat source 11 to a heat utilization device 12.

The heat pipe 10 is best described as a device capable of pumping heat from one end to the other, with no moving parts and with a negligible temperature drop. The sealed metallic pipe contains capillary tubes around inner walls and is filled with a liquid metal. The liquid metal is boiled off on one end of the pipe and condensed on the other with the condensate being returned by the capillary tubes.

The outer area of pipe is used for supplying heat and does not have to be the same as the area of pipe used for withdrawing heat. This characteristic is useful for conveying heat from a low power density radioisotope into a device that must operate at high temperature with a high heat flow rate per unit area like a thermionic diode.

The heat concentration ratio:

$$\frac{L_1}{L_2} = \frac{q/A_2}{q/A_1}$$

where:

$L_1$ = length of pipe used for supplying heat
$L_2$ = length of pipe used withdrawing heat
$q/A_1$ = heat over area ratio at the heat input side
$q/A_2$ = heat over area ratio at the heat output side.

In a practical embodiment, the heat utilization device 12 would comprise a thermoelectric generator for converting heat directly to electricity. The benefits to be derived from this invention are made possible by using a heat pipe in connection with a radioisotope heat source, such as Strontium 90, for isolating a thermoelectric converter from the radioactive materials. When considering manned applications whether in this atmosphere or beyond, the complete shielding of a radioisotope source such as Strontium 90 becomes a necessity. When thermoelectric couples are placed in intimate contact with a fission product heat source, the quantity of fuel, the shape of the fuel element(s) and the shielding philosophy determine the efficiency of the thermoelectrics and the weight of the shielding. Frequently, these two criteria are in conflict for optimal shape and weight causing present thermoelectric generators to represent a compromise. When, of necessity, an ablative envelope is placed external to the thermoelectrics, heat flow from the cold junction to the radiator is impeded by the low thermal conductivity of virtually all ablatives.

By positioning the thermoelectric converter external to the source as shown in FIGURES 2 and 3, the source may be designed independently, with emphasis placed upon that design which best ensures containment of fuel and reduction of radiation to a safe level. Therefore, a shield design, which selectively optimizes the heat pipe approach demonstrates sizable weight savings and safety assurance over any other solid state nuclear generator.

FIGURE 3 illustrates a practical design for generating electric power in space. A spacecraft 20 is illustrated with an attached telescoping boom 21 supporting a nuclear heat supply 22. A heat pipe 23 connects a thermoelectric generator 24 with the heat supply 22. The heat supply 22 contains Strontium 90 fuel core 25 surrounded by a radiation shield 26. Surrounding the radiation shield 26 and heat pipe 23 is a thermal insulation 28. An ablative envelope 27 completely surrounds the thermal insulation 28 and the heat pipe 23 to allow the fuel core 25 and radiation shield 26 to re-enter the atmosphere without damage. The thermoelectric converter 24 with fins 29 is positioned on the fore side of the spacecraft 20 to avoid structural penetration of the radiation shield 26 or the ablative shield 27. Compton scattering from gamma impingement upon the thermoelectric converter 24 is reduced by the generator proper acting as a shadow shield. Fins are recommended as a convenient means of providing more radiating surface and thereby lowering the effective outside temperature as seen by the thermo couple comprising the thermoelectric converter 24. Fin area is independent of the heat source and may therefore be selected to optimize the thermoelectric materials.

The fin geometry and location will also serve to orient the generator to the desired attitude upon re-entry. Power out of the converter may be delivered to the spacecraft 20 by cabling extending along the external surface of the insulation of the generator proper. Prior to launch, external (artificial) cooling may be introduced by forced air directed on the converter finned assembly, thereby preventing a thermal excursion.

The benefits to be derived from the present invention will be best understood by considering a typical design for a 1-kw. electric system according to FIGURE 3. The following assumptions are made to form a basis for the calculations which follow:

(1) Strontium 90 is used as the oxide since it has better power density than titanate (primarily a terrestrial fuel type) and less corrosiveness, when fused, than the fluoride.

(2) A 1 kilowatt electrical power supply is used since this embodies the greatest fuel quantity for which shielding curves are presently available. Further, the weight of the unit suggests the need for a pair of such generators to provide stabilized balance during launch and orbit. Redundancy would also provide a safety factor, if one generator were to fail.

(3) Because graphic shielding data is limited, a uranium shield thickness is considered but theoretical tungsten density is factored in, and the shield is assumed to be tungsten for design considerations.

(4) In selecting a single stack fuel configuration, large rings may be pressed and sintered, or, pie segments may be fabricated and arranged to form hollow cylindrical segments which could be stacked to make up the array.

In the 1 kilowatt electric design being evaluated, a thermoelectric efficiency will be assumed to be 5 percent, heat loss to the system will be assumed to be 20 percent and radioactive decay will not be factored into fuel inventory.

1,000 watts (e)×20 (conversion)—20 kw. thermal to converter
20 kw. (th)×1.2 (loss factor)—24 kw. thermal from source
Sr–90 oxide power density—1.4 watts (th)/cc.
Sr–90 oxide density—3.7 gm./cc.
Total fuel volume (24 kw. th)—17.1 liters (0.60 cu. ft.)
Total fuel weight (24 kw. th)—63.3 kilograms (140 pounds).

A shielding level selected is 2 millirem/hr. to the manned craft. The inverse square law applied to a distance outward arbitrarily fixed at 8 meters is considered realistic for the proposed mission. This represents a generator surface radiation level of 256 mrem/hr. Uranium shielding needed to provide attenuation to 250 mrem./hr. is approximately 7.5 cm. thick. This thickness considers both primary and bremsstrahlung gamma radiation.

In order to optimize shield weight, a source configuration of a single right cylindrical shape is chosen. A hollow circular orifice running through the transverse length provides access for the heat pipe. Since the pipe is limited to heat flux, the exterior of which cannot pass more than 30 watts thermal, per cm.², this fixes minimal pipe diameter, and length.

A single fuel configuration composed of fuel segments each comprising a disc fuel with 2 cm. dia. hole and a cross section fuel thickness of six cm. was chosen for the design. In order for 17.1 liters of fuel to be accommodated by this lateral dimension, a height of 113 cm. is needed. Therefore, a stack of fuel discs will required.

Heat pipe volume—355 cc. (approx. 700 cm.² inner surf.)
Fuel volume—17,100 cc.
Combined volume—17,455 cc.

The configuration represents present state-of-art fabrication technology and the heat pipe inner surface exceeds the minimum (30 w./cm.²) of 666 cm.². It is understood that the fuel array will require double encapsulation with 100 percent closure to conform to safety criteria; however, this is included in the shield thickness calculations since it would also contribute to radiation level reduction.

Having previously determined the shield thickness required to reduce radiation to a safe level at the spacecraft, another consideration must be observed. It will be desirable for personnel to leave the spacecraft, in orbit, to take measurements or examine the craft. The shield shown in FIGURE 3 as a truncated cone provides maximum shielding between craft and source, and a solid "safe" angle for the crew outside the spacecraft. This novel approach takes advantage of view-angle shielding. Such a design would permit free movement through a major portion of a spacial sphere surrounding the spacecraft. Audible docimeters, worn by crew, would warn of approach into the solid angle danger area. Alternatively, a tether connecting the spaceman to a point on the craft could make impossible his accidental entry into the critical zone, by line length limitation.

Obviously, the same fuel array surrounded first by thermoelectrics, and then by the same (minimum) thickness of shield would result in a weight penalty of from 1.3 to 1.65 times that required with a heat pipe.

The shield material density is assumed to be theoretical and 19.3 g./cc. (tungsten). The cone diameter (at the truncated end) is 18 cm. and that of the wide end 30 cm. The volume of the cone was then calculated to be

|  | Ccs. |
|---|---|
|  | 50,880 |
| Minus fuel cavity | 17,450 |
| Shield volume before rounding | 33,430 |

Rounding off of the wide end reduces shield weight while maintaining the required 7.5 cm. thickness toward the spacecraft. This permits the subtraction of an additional 2,120 ccs.

|  | Ccs. |
|---|---|
|  | 33,430 |
| Minus rounding | 2,120 |
| Approximate shield volume | 31,300 |

With a shield material density of 18.3 gm./cc., shield weight is 600 kg. or 1,300 lbs. Although ablative shielding, bracketry, etc. will add to this weight, it still approaches the-watt-per-pound design objective of space power (nuclear) designers. This could not be achieved by conventional means and maintain the same degree of radiation protection offered by this design.

Safety, in the power system design, must preclude all other considerations. Here, the novel shield shape again demonstrates its attractiveness. FIGURE 3 shows the ablative envelope, optimizing the re-entry shape employed in the Mercury Spacecraft series. Unlike the internal thermoelectric module approach, the heat pipe design is not material-restricted because of limiting thermal conductivity of the ablative envelope. Therefore, that material which will optimize weight, cost and volume can be used.

In the heat pipe design, ablative material will contribute to thermal insulation around the shield. Coincidentally, the greatest amount of ablative material is required at the end opposite from the heat pipe entrance, thereby reducing heat loss at that point. Additional septa-type reflection/insulation may be added external to the ablative shield. By coating its exterior surface with a low emissivity material, further thermal economy can be realized. Therefore, the 20 percent heat loss anticipated is considered a realistic upper limit on heat waste in a space environment.

It appears that a more sophisticated design, predicated upon refined calculations would result in a complete 1 kw. power supply weighing approximately 1,300 pounds. This represents a weight-saving of from 400 to 600 pounds (possibly more) over a non-heat pipe approach.

What is claimed is:
1. In combination,
a space vehicle capable of flying above the atmosphere,
an electric generating means supported from and held in a fixed relationship to said space vehicle,
said means comprising a nuclear heat source,
a thermoelectric generator for generating electricity as a function of temperature difference,
and a heat pipe isothermally connecting said heat source with said generator.

2. A combination according to claim 1 in which said electric generating means is supported by a telescoping boom.

3. In combination,
a space vehicle capable of flying above the atmosphere,
an electric generating means supported from and held in a fixed relationship to said space vehicle,
said means comprising a radioisotope heat source,
a thermoelectric generator having a hot side and a cold side for generating electricity as a function of the temperature difference between said hot side and said cold side,
and a heat pipe isothermally connecting said heat source with the hot side of said generator.

4. A combination according to claim 3 which includes fins on said generator for enhancing the operating temperature difference.

5. In combination,
a space vehicle capable of flying above the atmosphere,
an electric generating means supported from and held in a fixed relationship to said space vehicle,
said means comprising a nuclear heat source,
a radiation shield surrounding said heat source,
a thermoelectric generator external to said heat source for generating electricity as a function of temperature difference,
said generator having a cold side and a hot side,
and a heat pipe isothermally connecting said heat source with the hot side of said generator.

6. A combination according to claim 5 which includes an ablative envelope surrounding said radiation shield and said thermal insulation.

No references cited.

FERGUS S. MIDDLETON, *Primary Examiner.*

U.S. Cl. X.R.

62—2, 437; 136—202; 165—105; 310—4